April 5, 1949.   H. P. PHILLIPS   2,466,473
RIDGE REAMER FOR CYLINDERS
Filed May 3, 1946
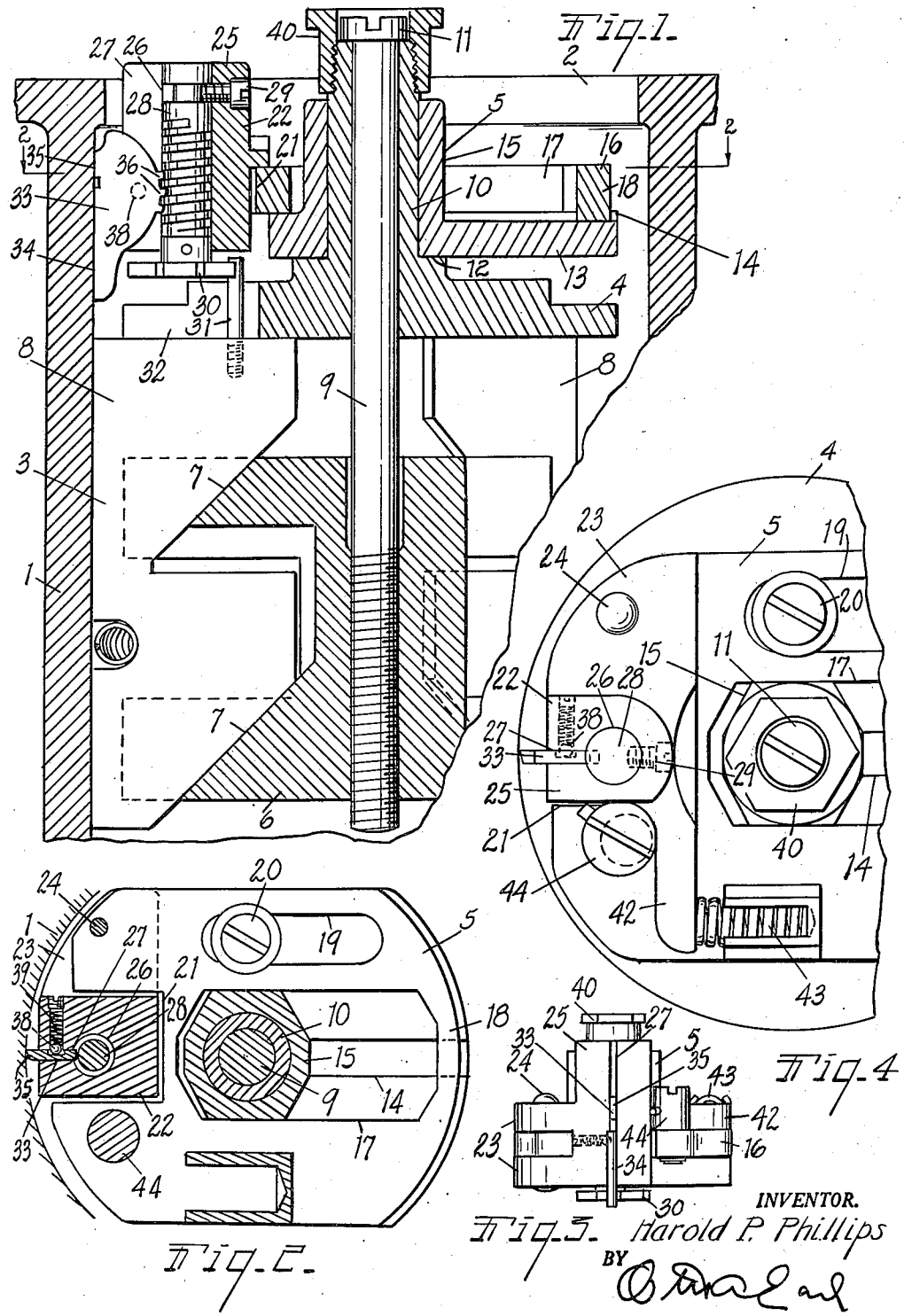
INVENTOR.
Harold P. Phillips
BY
ATTORNEY Patented Apr. 5, 1949

2,466,473

UNITED STATES PATENT OFFICE 2,466,473

RIDGE REAMER FOR CYLINDERS

Harold P. Phillips, Hastings, Mich., assignor to Hastings Manufacturing Company, Hastings, Mich.

Application May 3, 1946, Serial No. 667,228

11 Claims. (Cl. 77—2)

This invention relates to an improvement in the ridge reamer disclosed in Patent No. 2,226,015 issued to myself and Edward L. Bauer on December 24, 1940.

The main objects of this invention are:

First, to provide an improved device for reaming cylinder bores to remove ridges thereon caused by wear of a piston therein.

Second, to provide a novel tool holding device for the cutting tool which will intermittently advance the cutting edge with each revolution of the tool.

Third, to provide a novel means for mounting the cutting tool in the tool holder.

Objects relating to details and economies of the invention will appear from the following description, and a consideration of the accompanying drawings.

The preferred form of the invention is shown in the drawings in which:

Fig. 1 represents a vertical cross-sectional view through a cylinder showing a reamer embodying the invention in operative position therein.

Fig. 2 represents a horizontal cross sectional view taken along the corresponding broken line 2—2 in Fig. 1.

Fig. 3 represents an elevational view of the reamer looking toward the cutting element.

Fig. 4 represents a plan view of the reamer as mounted in a cylinder.

Referring to the drawings, the reference character 1 indicates the cylinder of an internal combustion engine which has been worn by the operation of a piston therein to form a ridge 2 around the upper end thereof. The device for cutting away this ridge consists of an expansible chuck generally indicated at 3, a mounting plate 4, and a rotatable cutting head generally indicated at 5.

The chuck 3 consists of a cam member 6 having three equally spaced radial extending arms defining cammed surfaces 7 which are arranged to cooperate with the cammed surfaces on the expansible jaws 8. The cam member 6 is threadedly connected to a pin 9 which extends upwardly through the mounting plate 4. The mounting plate has a cylindrical bushing 10 integrally formed thereon against the end of which the slotted head 11 of the pin is designed to bear. Tightening the pin 9 will draw the cam member and jaws upwardly against the under side of the mounting plate and will expand the jaws tightly into engagement with the walls of the cylinder.

The bushing 10 is formed with a shoulder at 12 against which the rotatable cutting head 5 is arranged at rest. The head includes a support plate 13 apertured to be freely rotatable on the bushing and provided with a radially extending slot 14 on one side thereof. A boss 15 having a hexagonal cross-section is positioned around the bushing 10 and securely fastened to the support plate 13, so that a suitable socket wrench may be applied thereto for rotating the cutting head on the bushing 10.

A tool carrier plate 16 is mounted on the tool support plate and is provided with a central slot 17 to clear the boss 15 so that the tool carrier is adjustable radially with respect to the support plate. An ear 18 formed on the bottom of the tool carrier plate at the back edge thereof is arranged to slide in the slot 14 and keep the carrier plate and support plates in alignment. Engagement of the boss 15 with the sides of the slot 17 also keeps the two plates aligned. The carrier plate is provided with a second slot 19 in which the shaft of the set-screw 20, threadedly connected to the tool support plate, is arranged to slide. The screw 20 is for securing the tool carrier to the support plate in adjusted position.

The front or working edge of the tool carrier plate is notched as at 21 to receive the body of the tool holder element 22. The tool holder is provided with spaced ears 23 which are positioned above and below the tool carrier plate and secured thereto by the pivot pin 24. The tool holder is formed with an upstanding boss 25 which defines the vertical bore 26. The working face of the holder is slotted vertically at 27 by a slot which extends therethrough to the bore 26.

Positioned in the bore 26 is a worm gear shaft 28 held in place by the lock-screw 29 (see Fig. 1). The bottom of the worm gear extends below the body of the tool holder and has securely fastened thereon a star wheel 30. The star wheel 30 is arranged to be engaged and rotated by a pin 31 mounted in the upper edge of one of the jaw plates 8, each time the tool carrier is rotated over the plate. A slot 32 in the mounting plate 4 provides for radial movement of the jaw in adjusting the chuck.

Mounted in the slot 27 is the cutting blade 33 having a guide edge 34 and a cutting edge 35. The back edge of the blade is formed in the shape of an arc and has gear teeth 36 formed thereon for engagement with the worm shaft 28. The blade is further provided with a vertical slot 37 on one side thereof into which the ball 38 is arranged to be pressed by the spring 39. The slot 37 is wider than the ball 38 and will not prevent the blade 33 from rocking in a vertical plane about the gear teeth 36 to properly engage the surface of the cylinder. However, it will retain the blade in the slot while the reamer is being adjusted.

The upper end of the bushing 10 is provided with a threaded connection for the shouldered lock-nut 40 which overhangs the boss 15 to prevent the rotatable cutting head from falling off the bushing. The lock-nut 40 is small enough to clear the inside of a socket wrench applied to the boss.

The tool carrier 22 is provided on its upper surface with an extending finger 42 which overlies the other ear of the tool carrier plate. The finger 42 is arranged to be urged by the spring 43 toward the surface of the cylinder and a vernier adjustment of the tool holder with relation to the surface of the cylinder may be obtained by the eccentric screw 44 mounted in the tool carrier plate adjacent to the finger.

From the above description it should be apparent that the reamer may be easily and securely mounted within the cylinder by holding the tool by the lock-nut 40 and adjusting the pin 9 with a screw-driver. A rough adjustment of the cutting edge is made by moving the tool carrier plate radially with respect to the support plate and clamping it in position with the lockscrew 20. Final adjustment of the cutting edge may then be obtained by use of the vernier screw 44 so that both the guide edge 34 and the cutting edge 35 of the blade are in contact with the worn portion of the cylinder wall. Then by rotating the cutting head of the reamer, the blade 33 will be advanced up the slot 27 in the tool holder by the worm gear 28 to cut away the ridge 2. Each turn of the head will cause engagement of the star wheel with the pin 31 to rotate worm gear. The cutting edge 35 will thus be brought into engagement with the ridge 2 and will make a complete cut around the cylinder before being advanced for a second cut. The guide edge 34 of the blade and the action of the spring 43 on the tool holder will maintain the cutting edge in alignment with the worn surface of the cylinder at all times.

I have illustrated and described my invention in a highly practical and commercial embodiment thereof. I have not attempted to show other adaptations, as it is believed that this disclosure will enable those skilled in the art to adapt the invention as may be desired.

Having thus described my invention what I claim as new and desire to secure by Letters Patent is:

1. An internal reaming device comprising an expansible chuck, a rotatable cutting head, a spring pressed tool holder carried on said head, a cutting tool carried by said holder and having a projection on the rear thereof, vertical screw means in said holder engageable with said projection to advance the cutting tool relative to said holder and said head and means carried on said chuck for advancing said screw means.

2. An internal reaming device comprising an axial fixed member, an expansible chuck, a cutting head rotatable about said axial member, a tool holder carried on said head and spring pressed radially of said axial member, a cutting tool carried by said holder and having a projection on the rear thereof, screw means in said holder parallel to said axial member and engageable with said projection to advance the cutting tool relative to said holder and said head, and means carried on said chuck for advancing said screw means.

3. An internal reaming device comprising an expansible chuck, a fixed plate, screw means for clamping said chuck against said plate, an adjustable head rotatable on said plate, a tool holder mounted on said head and defining an axially extending tool slot on the outer edge thereof, a cutting blade having a projection on its rear edge positioned in said slot, spring means carried by said holder for retaining said blade against radial movement in said slot, gear means carried in said holder and engageable with said projection on said blade for advancing said blade along said slot, and means carried by said chuck engageable with said gear means for periodically rotating said gear means.

4. An internal reaming device comprising an expansible chuck, a fixed plate, screw means for clamping said chuck against said plate, an adjustable head rotatable on said plate and around said screw means, a tool holder pivotally mounted on said head and defining an axially extending tool slot on the outer edge thereof, a cutting blade having a projection on its rear edge positioned in said slot, spring means carried by said holder for retaining said blade against radial movement in said slot, gear means carried in said holder and engageable with said projection on said blade for advancing said blade along said slot and means carried by an expansible portion of said chuck engageable with said gear means for periodically rotating said gear means.

5. An internal reaming device comprising an expansible chuck, a fixed plate, screw means for clamping said chuck against said plate, a radially adjustable head rotatable on said plate and around said screw means, a tool holder pivotally mounted on said head and defining an axially extending tool slot on the outer edge thereof, a cutting blade having an arcuate back edge positioned in said slot, spring pressed ball means carried by said holder for retaining said blade against radial movement in said slot, gear teeth formed on said arcuate edge, gear means carried in said holder and engageable with said teeth for advancing said blade along said slot, and means carried by said chuck engageable with said gear means for periodically rotating said gear means.

6. An internal reaming device comprising a cam member having radially disposed cam surfaces, a plurality of jaw plates arranged to cooperate with said cam surfaces, a fixed plate positioned over said jaw plates and defining a radial slot, an axial member for securing said jaw plates to said fixed plate, a tool carrier plate rotatably carried by said fixed plate, a tool holder pivotally mounted on said carrier plate and defining a journal bearing parallel to said axial member and a radially and axially extending slot, a worm gear positioned in said journal, a cutting blade positioned in said slot, gear teeth formed on the back of said blade and engaged with said worm gear, a star wheel secured to the bottom of said worm gear, and a pin secured to one of said jaw plates and extending through said slot in said fixed plate and engageable with said star wheel.

7. In combination with an internal reaming device having a rotatable head, a cutting blade having a work engaging edge and convex rear edge curved about said work engaging edge as a chord with a tooth formed thereon, a worm extended parallel to the axis of rotation of said head and engaged with said tooth for axially advancing said blade.

8. In combination with an internal reaming device having a rotatable head, a cutting blade having a cutting edge, a guiding edge aligned with said cutting edge, an arcuate rear edge curved about said cutting edge and guiding edge as a chord, gear teeth formed on said arcuate surface, a worm extended parallel to the axis of rotation of said head and engaged with said teeth for axially advancing said blade.

9. In combination with an internal reaming device having a rotatable head, a cutting blade having a cutting edge, a guiding edge aligned with said cutting edge, an arcuate rear edge curved about said cutting edge and guiding edge as a chord, gear teeth formed on said arcuate surface, worm feed means carried on said head parallel with the axis of rotation of said head engageable with said teeth, and means for turning said feed means on each revolution of said head.

10. In combination with an internal reaming device having a rotatable head, a cutting blade having a cutting edge, a guiding edge aligned with said cutting edge, an arcuate rear edge curved about said cutting edge and guiding edge as a chord, gear teeth formed on said arcuate surface, worm feed means carried on said head parallel with the axis of rotation of said head engageable with said teeth, means for turning said feed means on each revolution of said head, and means on said head for urging said blade and said feed means toward the work to be cut.

11. In combination with an internal reamer having a spring pressed tool holder, a blade having a slot along one side thereof and an arcuate rear edge, gear teeth formed on said rear edge, a spring pressed ball carried by said holder and engageable with said slot, and worm feed means carried by said holder and engageable with said teeth for advancing said blade axially of said head.

HAROLD P. PHILLIPS.

REFERENCES CITED

The following references are of record in the file of this patent:

UNITED STATES PATENTS

| Number | Name | Date |
|---|---|---|
| 596,295 | French | Dec. 28, 1897 |
| 1,214,754 | Carscadden | Feb. 6, 1917 |
| 1,470,641 | Pochila | Oct. 16, 1923 |
| 1,530,689 | Odom | Mar. 24, 1925 |
| 1,973,386 | Morgan | Sept. 11, 1934 |
| 2,040,273 | Rottler | May 12, 1936 |
| 2,046,386 | Kettl | July 7, 1936 |
| 2,205,237 | Beardsley | June 18, 1940 |
| 2,226,015 | Phillips et al. | Dec. 24, 1940 |